(12) United States Patent
McCord

(10) Patent No.: US 6,167,857 B1
(45) Date of Patent: Jan. 2, 2001

(54) TIMED TUBE INDUCTION SYSTEM FOR IMPROVING THE PERFORMANCE AND EFFICIENCY OF AN INTERNAL COMBUSTION ENGINE

(76) Inventor: Ronald R. McCord, 854 Ginger Ave., Billings, MT (US) 59105

( * ) Notice: Under 35 U.S.C. 154(b), the term of this patent shall be extended for 0 days.

(21) Appl. No.: 09/369,049

(22) Filed: Aug. 4, 1999

Related U.S. Application Data

(60) Provisional application No. 60/095,781, filed on Aug. 7, 1998.

(51) Int. Cl.⁷ ............................. F02M 35/10; F02B 27/00
(52) U.S. Cl. ................................. 123/184.53; 123/184.58
(58) Field of Search ..................... 123/184.53, 184.54, 123/184.55, 184.58

(56) References Cited

U.S. PATENT DOCUMENTS

| | | |
|---|---|---|
| 3,177,973 | 4/1965 | Benes . |
| 3,209,532 | 10/1965 | Morris et al. . |
| 4,457,267 | 7/1984 | Gorr . |
| 4,512,311 * | 4/1985 | Sugiyama ................................. 123/432 |
| 4,628,880 * | 12/1986 | Aoyama et al. ......................... 123/432 |
| 4,682,571 * | 7/1987 | Kaufman et al. ....................... 123/73 A |
| 4,848,281 | 7/1989 | McCord .................................... 123/52 |
| 4,952,182 | 8/1990 | Curtis et al. . |
| 5,129,367 * | 7/1992 | Lee et al. ............................ 123/52 MF |
| 5,680,839 * | 10/1997 | Moore ................................ 123/184.58 |

* cited by examiner

Primary Examiner—Andrew M. Dolinar
Assistant Examiner—Katrina B. Harris
(74) Attorney, Agent, or Firm—Dorsey & Whitney LLP; Shane P. Coleman

(57) ABSTRACT

A timed tube induction system according to the present invention is located at the downstream side of the carburetor in fluid communication with an induction hose between the carburetor and the intake manifold of an internal combustion engine having an intake valve. A gas capture end of the tube is located adjacent the intake valve and attached to the intake manifold to capture the backflow combustion mixture gases when the intake valve closes. The backflow gases flow through the tube and are injected into the fuel-air mixture exiting the carburetor at an injector end of the tube. The injector end of the tube is mounted to the induction hose to provide an acute angle between gas flowing along the centerline of the tube and gas flowing along the centerline of the induction hose to increase the velocity of gas flowing toward the intake manifold. The tube is adjustable in length so that the pulsating air flow in the tube can be timed with the opening of the intake valve over a broad range of engine rpm.

20 Claims, 6 Drawing Sheets

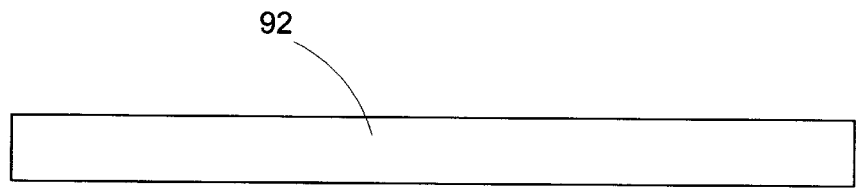
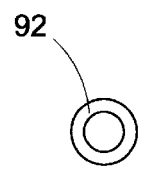
FIG. 14        FIG. 15
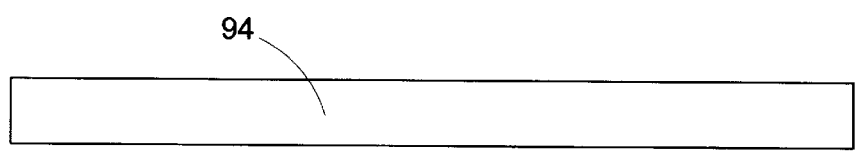
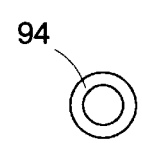
FIG. 16        FIG. 17
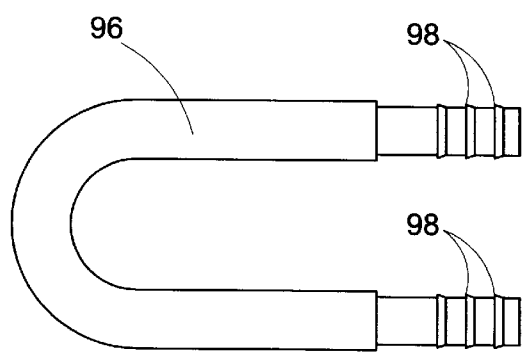
FIG. 18

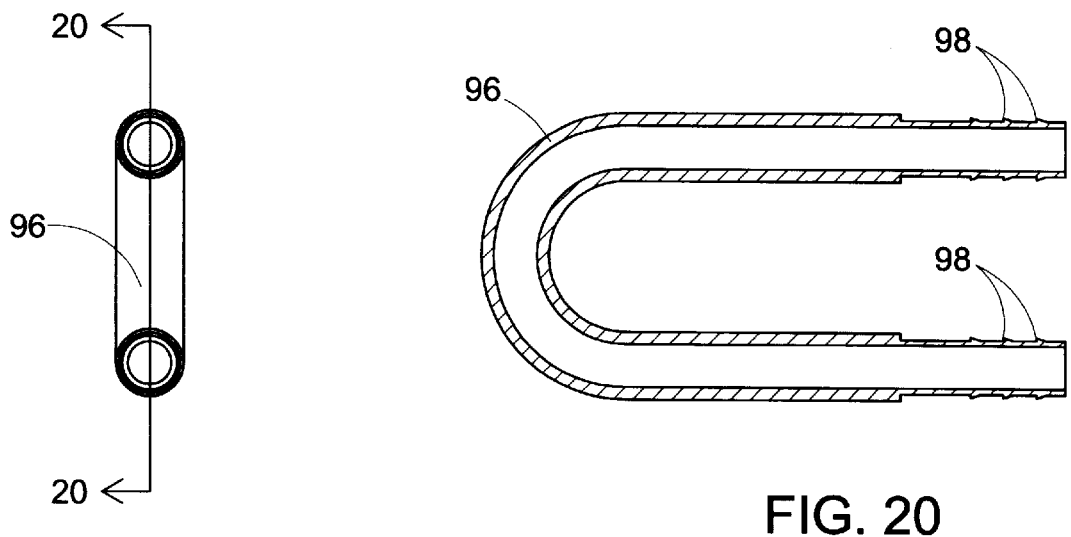
FIG. 19
FIG. 20
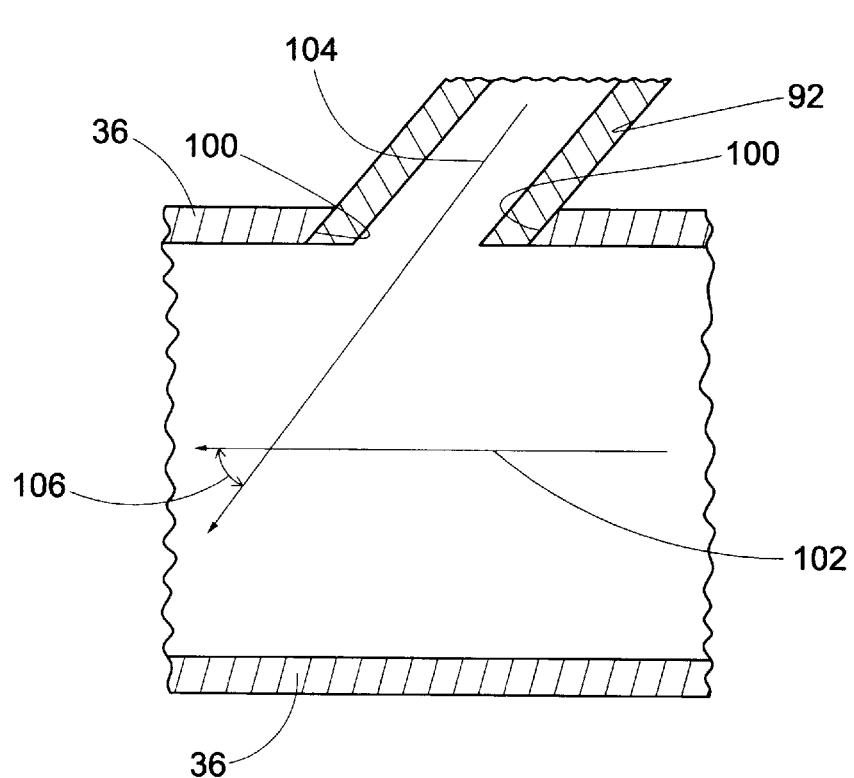
FIG. 21

TIMED TUBE INDUCTION SYSTEM FOR IMPROVING THE PERFORMANCE AND EFFICIENCY OF AN INTERNAL COMBUSTION ENGINE

This application claims benefit to provisional application 60/095,781 filed Aug. 7, 1998.

BACKGROUND OF THE INVENTION

The present invention relates to an induction apparatus for internal combustion engines, and more specifically to a timed tube induction system to improve the performance of internal combustion engines.

A tuned tube injector is shown in U.S. Pat. No. 4,457,267 to Gorr. This patent shows a tube which captures the backflow combustion mixture gases at the reed valve and diverts these gases through a one-way check valve and then injects these gases into the incoming air stream ahead of the carburetor. The check valve is necessary in the feedback tube to prevent incoming air from bypassing the carburetor.

SUMMARY OF INVENTION

A timed tube induction system according to the present invention is located at the downstream side of the carburetor in fluid communication with an induction hose between the carburetor and the intake manifold of an internal combustion engine having an intake valve. A gas capture end of the tube is located adjacent the intake valve and attached to the intake manifold to capture the backflow combustion mixture gases when the intake valve closes. The backflow gases flow through the tube and are injected into the fuel-air mixture exiting the carburetor at an injector end of the tube. The injector end of the tube is mounted to the induction hose to provide an acute angle between gas flowing along the centerline of the tube and gas flowing along the centerline of the induction hose to increase the velocity of gas flowing toward the intake manifold. The tube is adjustable in length so that the pulsating air flow in the tube can be timed with the opening of the intake valve over a broad range of engine rpm.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 14 is an elevational view of a first tube shown in FIG. 1;

FIG. 15 is a right end view of the first tube shown in FIG. 14;

FIG. 16 is an elevational view of a second tube shown in FIG. 1;

FIG. 17 is a right end view of the second tube shown in FIG. 16;

FIG. 18 is an elevational view of a metal U-tube shown in FIG. 1;

FIG. 19 is a right end view of the metal U-tube shown in FIG. 18;

FIG. 20 is a cross-sectional view taken along the line 20—20 in FIG. 19; and

FIG. 21 is an enlarged view of detail "A" shown in FIG. 1.

DESCRIPTION OF A PREFERRED EMBODIMENT

Figure 1:
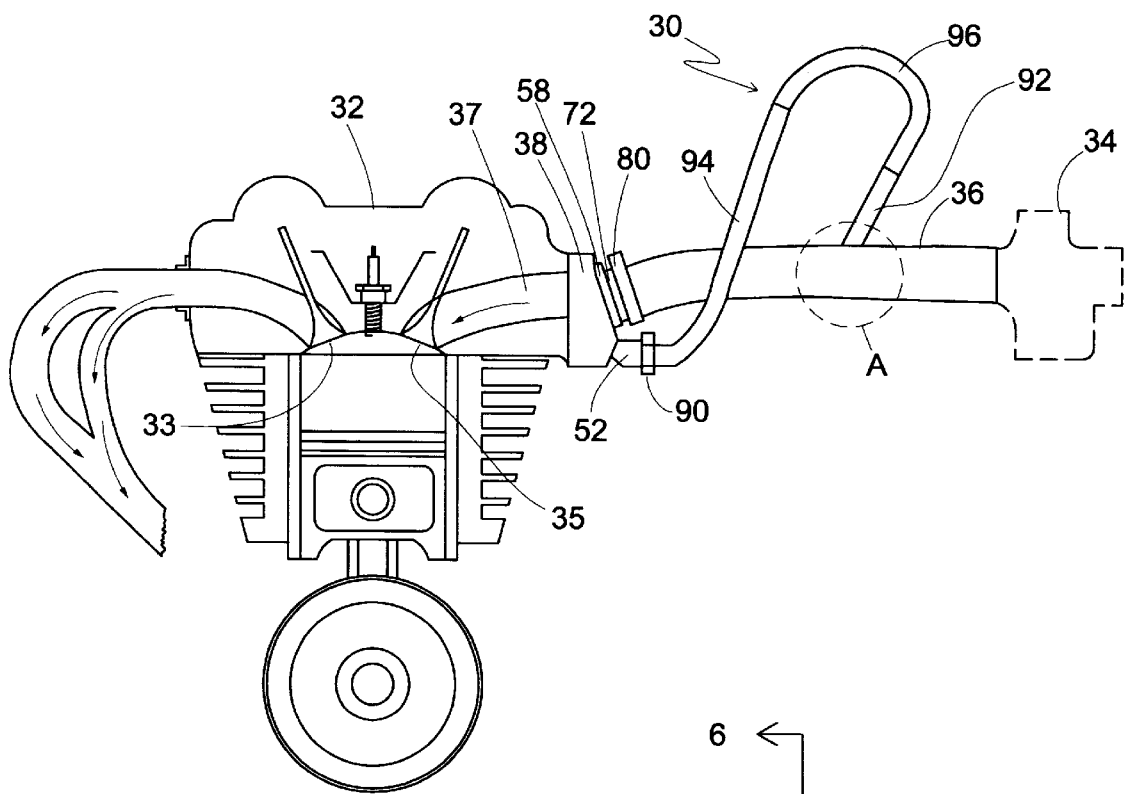
FIG. 1 is a schematic of the present invention as installed on internal combustion engine.

A preferred embodiment of a timed tube induction system 30 is shown in FIG. 1. In one form, a conventional engine 32 has a carburetor 34 with an induction hose 36 running from the carburetor to the engine. This engine characteristically exhausts burnt fuel through an exhaust valve 33 during a portion of a piston cycle, sucks a fuel-air mixture flowing in an induction passageway having an induction hose 36 and an intake manifold 37 to an intake valve 35 during a portion of the same piston cycle, and ignites the fuel-air mixture once during each cycle of the piston. The fuel-air mixture flowing through induction hose 36 normally has a rapid induction velocity whenever the intake valve is open, followed by a backflow induction velocity whenever the intake valve is closed. The timed tube induction system 30 of the present invention as used with an engine having a carburetor is positioned between the carburetor 34 and the intake valve 35 of the engine 32 and captures the backflow gasses.

In another form, a conventional engine 32 does not have a carburetor 34 for mixing fuel and air but does have a fuel injection system for injecting fuel into the engine cylinder directly. With this type of engine, the timed tube induction system 30 is positioned adjacent the intake valve to capture backflow gasses present in the induction passageway. With this type of engine, air only is flowing in the induction passageway and correspondingly the backflow is air only.

The following description of the present invention relates to a conventional engine 32 having a carburetor 34 but it should be understood that the present invention is also effective when used with a fuel injection engine.

Figure 2:
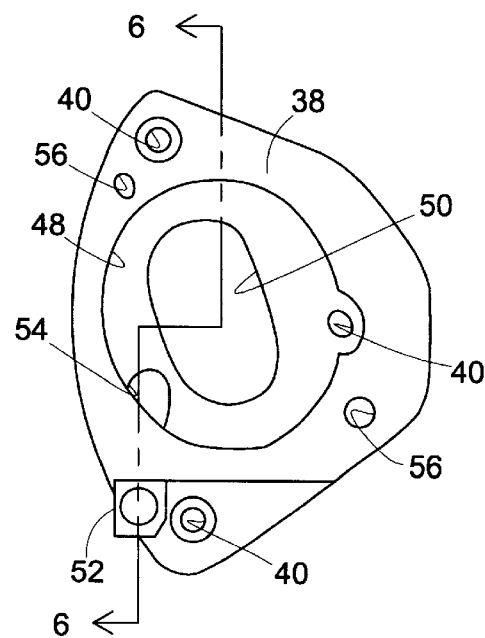
FIG. 2 is an elevational view of a pulse chamber shown in FIG. 1.
Figure 3:
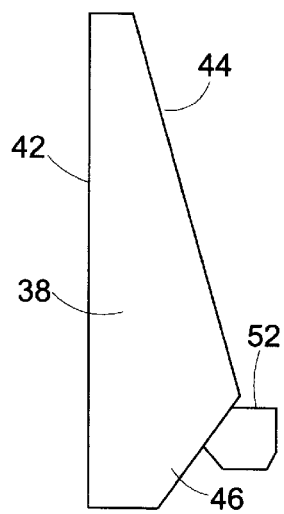
FIG. 3 is a left side view of the pulse chamber shown in FIG. 2.
Figure 4:
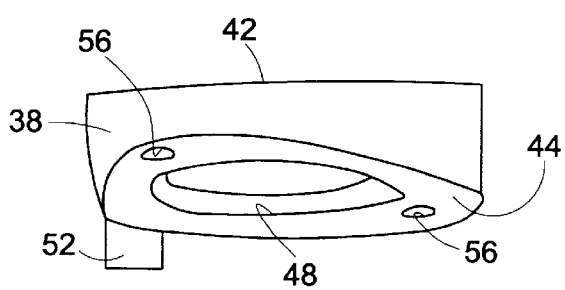
FIG. 4 is a top plan view of the pulse chamber shown in FIG. 2.
Figure 5:
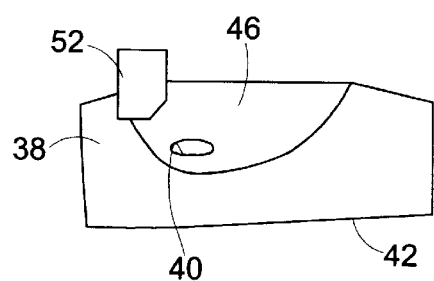
FIG. 5 is a bottom plan view of the pulse chamber shown in FIG. 2.
Figure 6:
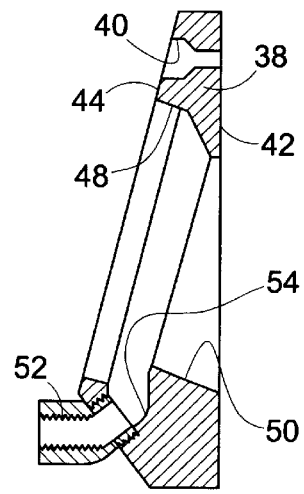
FIG. 6 is a cross-sectional view taken along the line 6-6 in FIG. 2.

A backflow pulse chamber 38, seen in FIGS. 2 through 6, includes countersunk holes 40, best seen in FIG. 6, which are used to attach the pulse chamber 38 to an engine 32. Conventional bolts (not shown) are inserted through countersunk holes 40 and threaded into corresponding holes in the engine block to attach pulse chamber 38 to the intake manifold of an engine. As shown in FIG. 3, pulse chamber 38 has a flat face 42 on one side for abutting the intake manifold 37, and first slanted face 44, and second slanted face 46 on the opposite side. As best seen in FIGS. 2 and 6, pulse chamber 38 also has a reversion-cone opening 48 in first slanted face 44 that is tapered through the block to emerge as an induction-port opening 50 opening through flat face 42. A hollow, internally-threaded fitting 52 is secured to pulse chamber 38 communicating with a cavity 54 that has been milled to permit fluid communication between hollow fitting 52 and the tapered opening in pulse chamber 38. In addition, two threaded, bolt-receiving holes 56 are positioned on first slanted face 44 on opposite sides of revision-cone opening 48.

Figure 7:
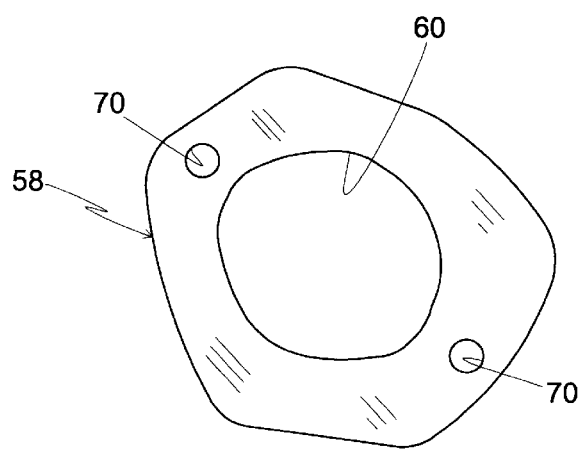
FIG. 7 is an elevational view of a reversion cone shown in FIG. 1.
Figure 9:
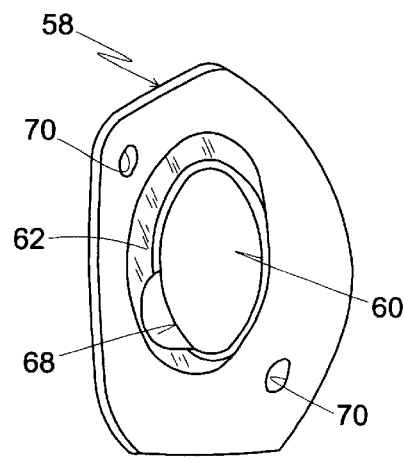
FIG. 9 is a perspective view of the reversion cone shown in FIG. 7.
Figure 8:
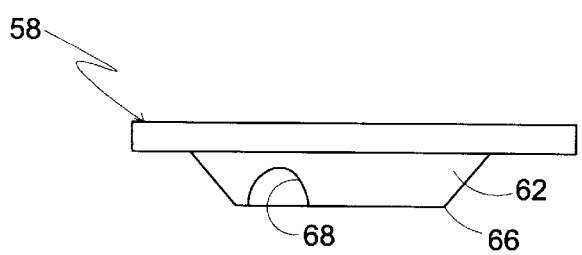
FIG. 8 is a bottom plan view of the reversion cone shown in FIG. 7.

A reversion cone 58 has parallel faces, as best seen in FIG. 8, with a hole 60 drilled through the reversion cone. In addition, as shown in FIG. 8, reversion cone 58 has a tapered circular flange 62 with an outside diameter at its widest dimension sized smaller than revision cone opening 48 in pulse chamber 38. Revision cone 58 also has a smaller dimension 66 which will fit very loosely into the tapered opening associated with revision-cone opening 48 so as to form a pulse-chamber void between circular flange 62 and the tapered opening in pulse chamber 38 occurring between revision-cone opening 48 and induction-port opening 50. Also a cutout 68 is formed in tapered flange 62 so that cutout 68 can be positioned over cavity 54 when revision cone 58 is inserted in pulse chamber 38 to allow the incoming captured flow stream to pass from threaded fitting 52, into cavity 54, through cutout 68, and on into pulse chamber 38. Again, two bolt holes 70 are provided in revision cone 58, as best seen in FIG. 7.

Figure 10:
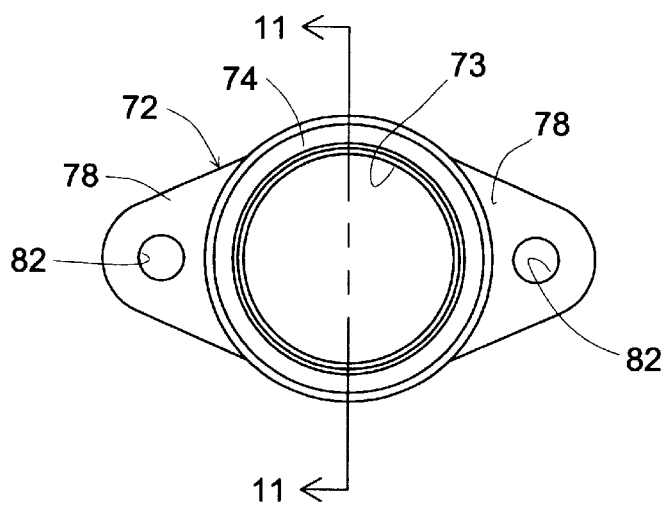
FIG. 10 is an elevational view of hose-receiver shown in FIG. 1.
Figure 11:
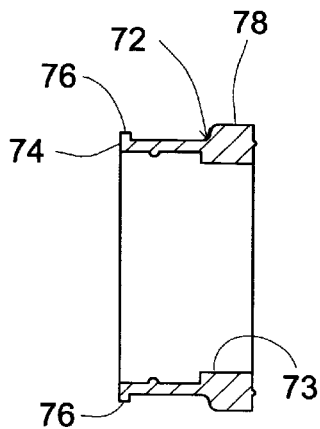
FIG. 11 is a cross-sectional view taken along the line 11—11 in FIG. 10.

As shown in FIGS. 1 and 10, a hose-receiver 72, made of a flexible material, is placed over and abuts reversion cone 58 on a side opposite pulse chamber 38. Hose-receiver 72 has an axial bore 73 therethrough as shown in FIG. 11. An outer rim 76 (seen in FIG. 11) is provided on face 74. A flange 78 is provided at each of the opposite ends of receiver 72 on either side of face 74. To secure induction hose 36 to hose receiver 72, hose 36 is forced over outer rim 76, and a conventional hose clamp 80 (as shown in FIG. 1) is used to tightly hold the induction hose on to hose-receiver 72. Bolt holes 82 are drilled adjacent opposite ends of flange 78.

A pair of conventional bolts (not shown) are threaded through bolt holes 82 of hose-receiver 72, bolt holes 70 of reversion cone 58, and into threaded, bolt-receiving holes 56 of pulse chamber 38. Once these two bolts are tightened, these three units are butted together to function as a single unit. This single unit can be bolted to the intake manifold of an engine by inserting conventional bolts in countersunk holes 40, and threaded into corresponding holes in the intake manifold.

Figure 12:
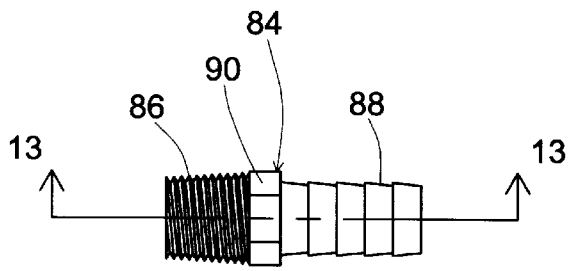
FIG. 12 is an elevational view of a hose-fitting shown in FIG. 1.
Figure 13:
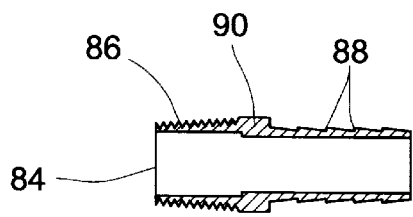
FIG. 13 is a cross-sectional view taken along the line 13—13 in FIG. 12.

A hollow, threaded, hose-fitting 84 is shown in FIG. 12 and 13. Hose-fitting 84 has threads 86 adjacent one end, hose barbs 88 adjacent the opposite end, and a hexagonal, wrench fitting 90 separating these two elements. Threads 84 are sized to cooperate with the internal threads of threaded fitting 52 located on pulse chamber 38 whenever hose-fitting 84 is threaded into threaded fitting 52. Since hose-fitting 84 is hollow, and threaded fitting 52 is hollow, fluid communication exists from the threaded end of hose-fitting 84 clear through to the tapered opening between revision-cone opening 48 and induction port opening 50 whenever hose-fitting 84 is threaded into threaded fitting 52.

A first induction tube 92 is shown in FIGS. 14 and 15. In a preferred embodiment, tube 92 is made of a material, such as rubber, which can be trimmed to make shorter lengths.

A second induction tube 94 is shown in FIGS. 16 and 17. Again in a preferred embodiment, second tube 94 is made of a material, such as rubber, which can be trimmed to make shorter lengths.

A metal U-tube 96 is shown in FIGS. 18, 19, and 20 which has hose barbs 98 adjacent the two free ends. The free ends with hose barbs 98 are sized to tightly accept first tube 92 and second tube 94.

As best seen in FIG. 21, an injector opening 100 is cut in induction hose 36 so as to create an acute angle 106 between the gas vector 104 flowing along the centerline of first tube 92 and the incoming gas flow vector 102 of the flow stream flowing along the centerline of induction hose 36. First hose 92 is cut to just enter injection opening 100, but not to extend into the interior of induction-hose 36. Since there is an acute angle 106 between gas vector 104 and gas vector 102, captured backflow exiting from first hose 92 assists in driving the flow stream transiting an induction passage flowing in the direction of flow vector 102. First tube 92 is cemented into injector opening hole 100 to secure first tube 92 to induction tube 36.

In operation, an end of first tube 92 is installed in induction hose 36 and an end of second tube 94 is installed over hose-fitting 84 as described above. The free ends of tubes 92 and 94 are joined with U-tube 96. Then as the fuel-air mixture transits the induction passage in the direction of flow vector 102 in induction hose 36, the backflow of the fuel-air mixture pulsates with the opening and closing of the intake valve of the engine 32. The tubes 92 and 94, connected with U-tube 96, act as an accumulator to receive the backflow caused when the fuel-air mixture strikes against a closed intake valve of the engine. The inertia of the backflow gas causes an increase in pressure within induction hose 36 and forces the backflow fuel-air mixture into tube 94.

When the intake valve opens and the fuel-air mixture in hose 36 flows into the engine cylinder, the captured backflow gases in tubes 92 and 94 are drawn into induction hose 36 through injector opening 100. Since the captured backflow from tube 92 is injected into the flow stream transiting induction hose 36 at an acute angle, very little turbulence results. Timing of the pulsating movement of the captured backflow in tubes 92 and 94 is achieved by trimming the length of first hose 92 and second hose 94. This trimming is done to adjust the timing of the pulsating pressure within tubes 92 and 94 with the engine cycles over a broad range of engine rpm.

With a fuel injection engine, the induction passageway carries air only to the intake valve. It is intended that the present injection 30 can be used with this type of engine by mounting the tubes 92 and 94 in the induction passageway as described above for a carburetor engine.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

What is claimed is:

1. A timed tube induction apparatus comprising:
  a pulse chamber that defines a passage having
    an inlet that receives air or a fuel-air mixture from an induction passageway;
    an outlet that communicates the air or the fuel-air mixture to a cylinder of an engine; and an interior sidewall, that defines an anti-reversionary cone, which cone redirects air or the fuel-air mixture flowing from an outlet to inlet direction to an inlet to outlet direction within the pulse chamber;

wherein the pulse chamber has a recirculating tube opening through the sidewall, at the anti-reversionary cone, whereby some of the air or the fuel-air mixture flowing from an outlet to inlet direction and being redirected by the anti-reversionary cone is directed into the recirculating tube opening; and a recirculating tube having
a capture end connected to the recirculating tube opening; and
an injection end adapted for connection to the induction passageway.

2. The timed tube induction apparatus of claim 1, wherein the passage through the pulse chamber is wider than the induction passageway for which it is adapted.

3. The timed tube induction apparatus of claim 2, wherein the pulse chamber comprises:

a chamber portion through which the pulse chamber passage runs, said chamber portion having an anti-reversionary cone end, wherein the interior sidewall is tapered such that the passage becomes wider at the anti-reversionary cone end; and a cone plate connected to the anti-reversionary cone end of the chamber portion, said cone plate having a flange that protrudes toward the chamber portion, which flange defines the pulse chamber passage through the cone plate, wherein the pulse chamber passage is narrower at the cone plate than at the anti-reversionary cone end of the chamber portion.

4. The timed tube induction apparatus of claim 3, wherein during operation of the engine the air or fuel-air mixture creates a higher pressure in the pulse chamber than is created in the induction passageway at the point at which the injection end of the recirculating tube is connected, whereby the air or fuel-air mixture naturally flows through the recirculating tube in a single direction from the capture end to the injection end.

5. The timed tube induction apparatus of claim 4, wherein the recirculating tube has a length that is timed to the engine such that a burst of air or fuel-air mixture that enters the capture end of the recirculating tube when an engine valve is closed returns to the pulse chamber on an immediately subsequent cycle, when the engine valve is open.

6. The timed tube induction apparatus of claim 5, wherein the recirculating tube is a rubber hose, and wherein the pulse chamber further comprises an inlet coupler connected to the cone plate and forming the inlet of the pulse chamber, wherein said inlet coupler is capable of receiving and securely attaching to the induction passageway.

7. The timed tube induction apparatus of claim 6, further comprising an induction passageway having:

an injection opening connected to the injection end of the recirculating tube; and
an exit opening connected to the inlet of the pulse chamber.

8. An apparatus for improving engine performance by recirculating air or a fuel-air mixture moving in a direction away from an input to a cylinder, so that the air or fuel-air mixture may be injected into an induction passageway having a high pressure region near the cylinder and a low pressure region further from the cylinder, and returned to the cylinder on a subsequent cycle comprising:

an induction passageway having
an inlet opening that receives air or a fuel air mixture;
an outlet opening that communicates the air or fuel-air mixture to an engine cylinder;
a low pressure region located near the inlet opening;
a high pressure region located near the outlet;
a recirculation outlet located in the high pressure region;
a recirculation inlet located in the low pressure region; and a valveless recirculation means having:
a first end operably connected to the recirculation outlet of the induction passageway; and
a second end operably connected to the recirculation inlet of the induction passageway;

whereby the recirculation means recirculates the air or fuel-air mixture from the high pressure region to the low pressure region by allowing air to naturally flow in a single direction from the first end to the second end.

9. The system of claim 8, wherein the recirculation means is a timed tube that has a length that is timed to the engine such that a burst of air or fuel-air mixture that enters the first end of the timed tube when an engine valve is closed returns to the outlet opening on an immediately subsequent cycle, when the engine valve is open.

10. The system of claim 9, wherein the induction passageway has an interior sidewall that forms an anti-reversionary cone in the high pressure region, which anti-reversionary cone captures the air or fuel-air mixture that is flowing from an outlet to inlet direction and redirects the air or fuel-air mixture to the first end of the recirculation means.

11. The system of claim 10, wherein the induction passageway is wider at the high pressure region than at the low pressure region.

12. The system of claim 11, wherein the anti-reversionary cone captures the air or the fuel-air mixture by creating a diameter of the induction passageway that varies along a longitudinal axis of the induction passageway, whereby said walls redirect the air or fuel-air mixture moving away from the cylinder toward the cylinder, and wherein the timed tube is a rubber hose.

13. A pulse chamber for improving the performance of an engine comprising:

a chamber portion comprising:
an outlet side adapted for connection to an engine for communication of air or a fuel-air mixture to the engine;
an inlet side; and
an interior surface that defines a passage through the chamber portion, whereby the air or fuel-air mixture may flow in an inlet to outlet direction to enter a cylinder of the engine, wherein said interior surface is tapered such that the passage is wider at the inlet side than at the outlet side; and a cone plate comprising:
an inlet side adapted for connection to an induction passageway of an engine; and
an outlet side connected to the inlet side of the chamber portion
wherein said cone plate has an opening aligned with the chamber portion passage, and has a flange on the outlet side that encircles the opening and protrudes into the passage of the chamber portion;

wherein the adjacent positions of the flange of the cone plate and the tapered wall of the passage at the inlet side of the pulse chamber form an anti-reversionary cone that captures the air or fuel-air mixture moving from an outlet to inlet direction in the pulse chamber and redirects the air or fuel-air mixture to an inlet to outlet direction.

14. The pulse chamber of claim 13, wherein the inlet side of the cone plate is adapted to be connected to an induction passageway to allow the air or fuel-air mixture to flow from the induction passageway through the opening in the cone plate to the chamber portion passage, and wherein the passage through the chamber portion is wider than the induction passageway for which the cone plate is adapted.

15. The pulse chamber of claim 14, wherein the pulse chamber has a recirculation opening through the sidewall into the anti-reversionary cone, and wherein during operation of the engine, the air or fuel-air mixture captured by the anti-reversionary cone is directed through the recirculation opening.

16. The pulse chamber of claim 15, further comprising a recirculation tube having a capture end connected to the recirculation opening and an injection end adapted for connection to the induction passageway, wherein during operation of the engine, a region of high pressure is created near the anti-reversionary cone near the recirculation opening and an area of low pressure is created in the induction passageway near the injection end of the recirculation tube, whereby the air or fuel-air mixture captured by the anti-reversionary cone naturally flows through the recirculation tube in a single direction from the capture end to the injection end.

17. The pulse chamber of claim 16, wherein the recirculation tube has a length that is timed to the engine such that a burst of air or fuel-air mixture that enters the capture end of the recirculation tube when an engine valve is closed returns to the pulse chamber through the induction passageway on an immediately subsequent cycle, when the engine valve is open.

18. The pulse chamber of claim 17, further comprising an induction passageway having:

an injection opening, connected to the injection end of the recirculation tube; and an exit opening connected to the inlet of the pulse chamber.

19. The pulse chamber of claim 18, wherein the pulse chamber further comprises an inlet coupler connected to the inlet side of the cone plate, wherein said inlet coupler is capable of receiving and securely attaching to the induction passageway.

20. The pulse chamber of claim 19, wherein the recirculation tube is a rubber hose.

* * * * *